US012767046B2

(12) United States Patent
Shirai

(10) Patent No.: US 12,767,046 B2
(45) Date of Patent: Oct. 20, 2026

(54) INATTENTIVENESS DETERMINATION DEVICE AND METHOD

(71) Applicant: TOYOTA JIDOSHA KABUSHIKI KAISHA, Toyota (JP)

(72) Inventor: Ryo Shirai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 180 days.

(21) Appl. No.: 18/958,284

(22) Filed: Nov. 25, 2024

(65) Prior Publication Data

US 2025/0187539 A1 Jun. 12, 2025

(30) Foreign Application Priority Data

Dec. 12, 2023 (JP) ................................. 2023-209281

(51) Int. Cl.
*B60Q 9/00* (2006.01)
*G06V 20/59* (2022.01)

(52) U.S. Cl.
CPC ............. *B60Q 9/00* (2013.01); *G06V 20/597* (2022.01)

(58) Field of Classification Search
CPC ......... B60Q 9/00; G06V 20/597; G06V 20/59
See application file for complete search history.

(56) References Cited

U.S. PATENT DOCUMENTS 9,805,275 B2 10/2017 Okuda
10,525,981 B2 1/2020 Matsumura
10,579,056 B2 3/2020 Matsumura
10,649,452 B2 5/2020 Ichikawa et al.
10,706,299 B2 7/2020 Matsumura
10,814,880 B2 10/2020 Kishi
10,895,875 B2 1/2021 Hashimoto et al.
10,915,100 B2 2/2021 Matsushita et al.
11,173,919 B2 11/2021 De Weser et al.
2018/0201276 A1* 7/2018 Matsumura ........... B60W 40/09
2022/0292887 A1* 9/2022 Cooprider ............. B60W 40/08
2023/0106487 A1* 4/2023 Alexander ............ B60W 40/08 340/576
2023/0360252 A1* 11/2023 Washio ................ G06V 40/193
2023/0373508 A1* 11/2023 Egashira ................ B60K 28/02
2024/0199082 A1* 6/2024 Balch ................ B60W 60/0055
2024/0246542 A1* 7/2024 Akaho ................. B60K 28/066
2024/0375665 A1* 11/2024 Morimoto ............ B60W 40/08
(Continued)

FOREIGN PATENT DOCUMENTS

JP 2018-108784 A 7/2018

*Primary Examiner* — Aaron W Carter
(74) *Attorney, Agent, or Firm* — Sughrue Mion, PLLC

(57) ABSTRACT

An inattentiveness determination device which determines whether or not a driver of a vehicle is inattentive, includes: a line-of-sight direction detection unit for detecting a line-of-sight direction of the driver; a towing determination unit for determining whether or not a towed vehicle is connected to the vehicle; an inattentiveness determination unit determining whether or not the driver is an inattentive state, based on whether or not a line-of-sight direction of the driver satisfies an inattentiveness determination condition; and a condition setting unit for setting the inattentiveness determination condition so that when the towed vehicle is connected to the vehicle, the inattentiveness determination condition is relaxed as compared with when the towed vehicle is not connected to the vehicle.

5 Claims, 4 Drawing Sheets

(56) References Cited

U.S. PATENT DOCUMENTS

| | | | | |
|---|---|---|---|---|
| 2025/0187539 | A1* | 6/2025 | Shirai | B60Q 9/00 |
| 2025/0206319 | A1* | 6/2025 | Tonuma | G06V 40/18 |
| 2026/0109367 | A1* | 4/2026 | Shirai | B60W 50/082 |

* cited by examiner

INATTENTIVENESS DETERMINATION DEVICE AND METHOD

FIELD

The present disclosure relates to an inattentiveness determination device and an inattentiveness determination method.

BACKGROUND

Conventionally, there has been known an inattentiveness determination device that detects a line-of-sight direction of a driver and determines whether or not the driver is in an inattentive state based on the detected line-of-sight direction (JP2018-108784A or the like). In particular, in the inattentiveness determination device described in JP2018-108784A, when the line-of-sight direction of the driver is directions of both side mirrors, a rearview mirror, a multimedia display, and a meter panel when the vehicle travels straight, it is determined that the driver is inattentive.

SUMMARY

When a vehicle is towing a towed vehicle, a driver checks a condition of the towed vehicle through a side mirror, a rearview mirror, or the like at a certain frequency in order to check the state of the towed vehicle. As a result, when the vehicle is towing the towed vehicle, there is a possibility that the frequency at which the driver is determined to be in an inattentive state becomes unnecessarily high.

In view of the above problems, an object of the present disclosure is to prevent a driver from being unnecessarily determined to be in an inattentive state even when a vehicle is towing a towed vehicle.

The gist of the present disclosure is as follows.

(1) An inattentiveness determination device which determines whether or not a driver of a vehicle is inattentive, comprising:

- a line-of-sight direction detection unit for detecting a line-of-sight direction of the driver;
- a towing determination unit for determining whether or not a towed vehicle is connected to the vehicle;
- an inattentiveness determination unit determining whether or not the driver is an inattentive state, based on whether or not a line-of-sight direction of the driver satisfies an inattentiveness determination condition; and
- a condition setting unit for setting the inattentiveness determination condition so that when the towed vehicle is connected to the vehicle, the inattentiveness determination condition is relaxed as compared with when the towed vehicle is not connected to the vehicle.

(2) The inattentiveness determination device according to above (1), wherein

- the inattentiveness determination condition includes a condition relating to a region of a line-of-sight direction of the driver, and
- the condition setting unit sets the inattentiveness determination condition such that, when the towed vehicle is connected to the vehicle, in the case where the line-of-sight direction of the driver is within a towed vehicle viewing region for visually recognizing an image of the towed vehicle, the inattentiveness determination condition is not satisfied.

(3) The inattentiveness determination device according to above (1), wherein

- the inattentiveness determination condition includes a condition relating to a region in the line-of-sight direction of the driver and a duration time of viewing each region, and
- the condition setting unit sets the inattentiveness determination condition so that, in the case where the line-of-sight direction of the driver is within the towed vehicle viewing region for visually recognizing an image of the towed vehicle, when the towed vehicle is connected to the vehicle, the inattentiveness determination condition is satisfied with a longer duration time than when the towed vehicle is not connected.

(4) The inattentiveness determination device according to above (3), further comprising a notification unit for notifying the driver when it is determined that the driver is in an inattentive state, wherein

- when the towed vehicle is connected to the vehicle, in the case where the line-of-sight direction of the driver is within a towed vehicle viewing region for visually recognizing an image of the towed vehicle, the notification unit notifies the driver in a manner different from that when the towed vehicle is not connected to the vehicle.

(5) An inattentiveness determination method for determining whether or not a driver of a vehicle is inattentive, including:

- detecting a line-of-sight direction of the driver;
- determining whether or not a towed vehicle is connected to the vehicle;
- determining whether or not the driver is in an inattentive state, based on whether or not a line-of-sight direction of the driver satisfies an inattentiveness determination condition; and
- setting the inattentiveness determination condition so that when the towed vehicle is connected to the vehicle, the inattentiveness determination condition is relaxed as compared with when the towed vehicle is not connected to the vehicle.

DESCRIPTION OF EMBODIMENTS

Figure 1:
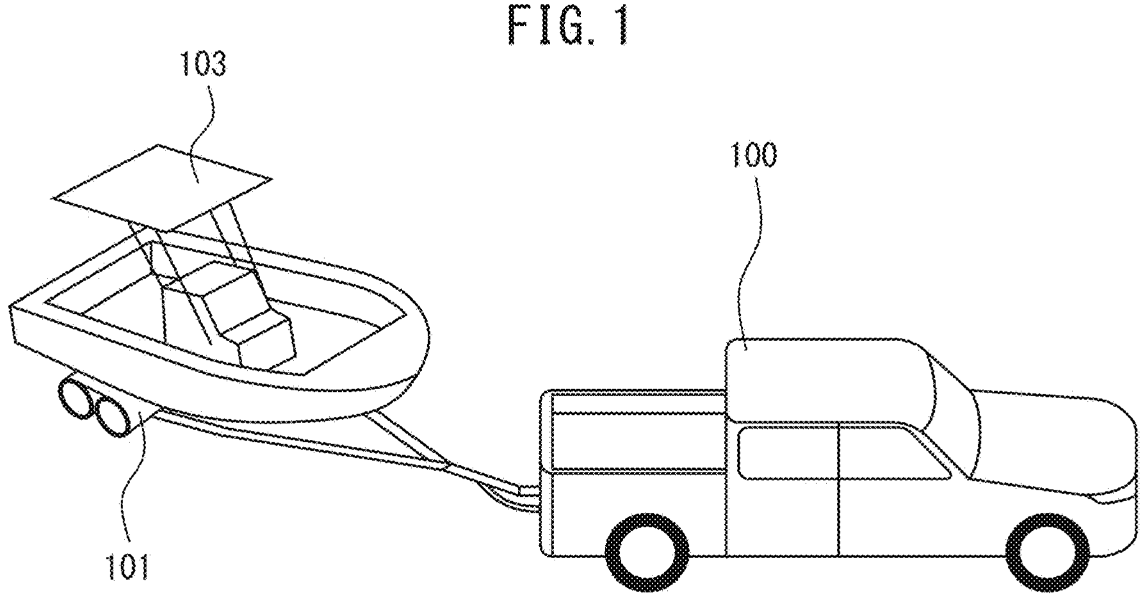
FIG. 1 is a schematic view showing a vehicle and a towed vehicle.

Hereinafter, embodiments will be described in detail with reference to the drawings. In the following description, the same reference numerals are given to the same constituent elements.

Device Configuration

Figure 2:
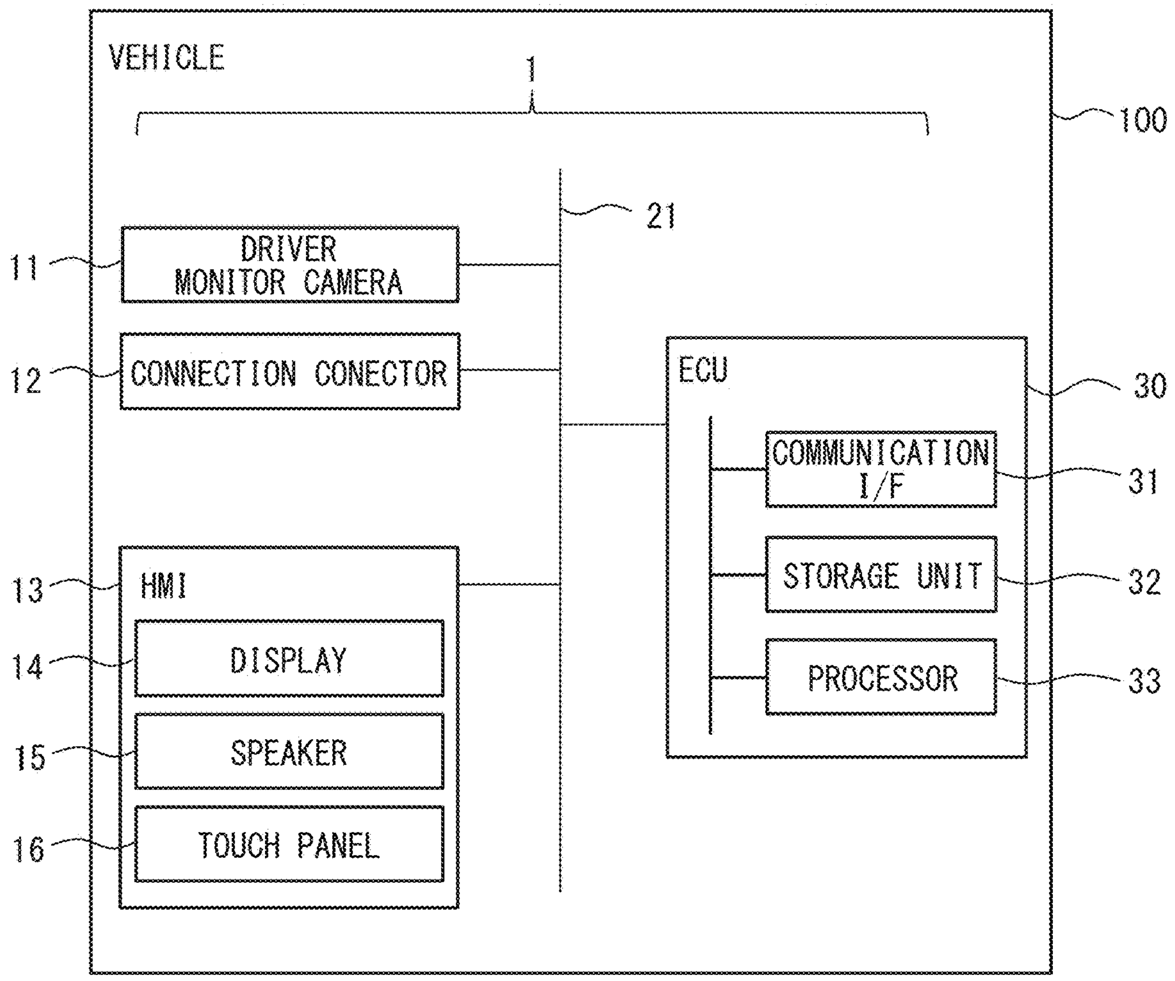
FIG. 2 is a block diagram schematically showing a configuration of a driver monitor system.
Figure 3:
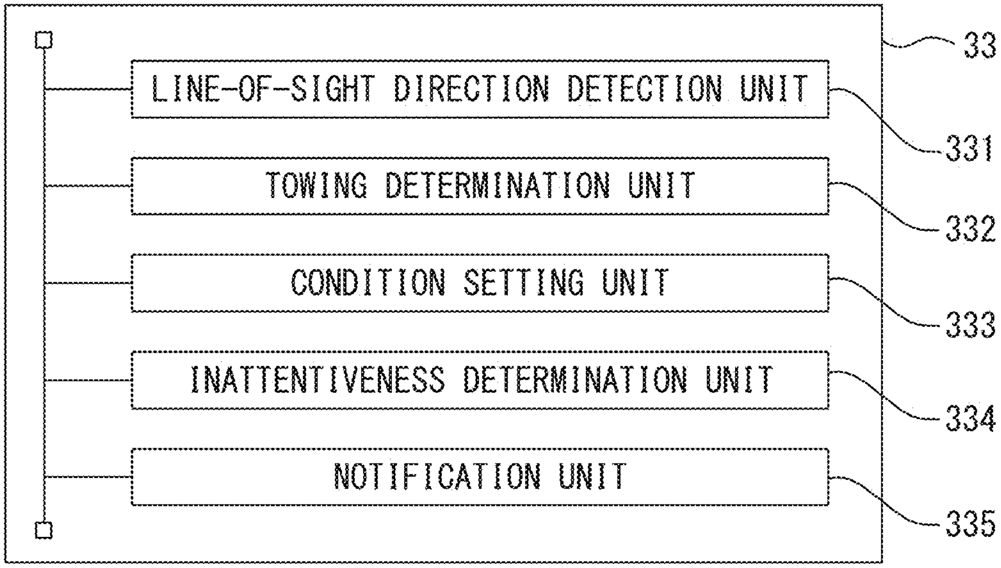
FIG. 3 is a functional block diagram of a processor of an ECU.

Referring to FIGS. 1 to 3, a configuration of a driver monitor system 1 equipped with an inattentiveness determination device according to one embodiment will be described. FIG. 1 is a schematic diagram showing a vehicle 100 provided with a driver monitor system 1, and a towed vehicle 101.

As shown in FIG. 1, the vehicle 100 is configured to be able to tow the towed vehicle 101. The vehicle 100 has a fitting for attaching the towed vehicle 101, and a fitting of the towed vehicle 101 is attached to the fitting of the vehicle 100.

In the present embodiment, the vehicle 100 is not a vehicle mainly intended for towing, such as a trailer head, but a vehicle not mainly intended for towing, such as a passenger car. In addition, the towed vehicle 101 may not only be a boat trailer that carries a waterborne vehicle such as the boat 102 as shown in FIG. 1, but also be any towed vehicle as long as it can be towed by a passenger car or the like, such as a camping trailer that provides a living space, a bike trailer that carries a bike, or a multi-trailer that can carry various objects.

FIG. 2 is a block diagram schematically showing a configuration of the driver monitor system 1. The driver monitor system 1 is mounted on the vehicle 100 and determines whether or not the driver of the vehicle 100 is inattentive. As illustrated in FIG. 2, the driver monitor system 1 includes a driver monitor camera 11, a connection connector 12, a human-machine interface (HMI) 13, and an electronic control unit (hereinafter referred to as "ECU") 30. The driver monitor camera 11, the connection connector 12, the HMI 13, and the ECU 30 are communicably connected via, for example, an in-vehicle network 21. The in-vehicle network 21 is, for example, a network conforming to a standard such as CAN (Controller Area Network).

The driver monitor camera 11 is an example of an image capturing device that captures an image of a driver. In the present embodiment, the driver monitor camera 11 is provided at an upper portion of a steering column, and is arranged toward the driver so as to be able to capture an image of the driver, specifically, the face and a part of the upper body of the driver. The driver monitor camera 11 may be provided at a position different from the upper portion of the steering column as long as an image of the driver of the vehicle 100 can be captured. For example, the driver monitor camera 11 may be provided in a steering wheel, a room mirror, a meter panel, a meter hood, or the like of the vehicle 100.

The driver monitor camera 11 includes a camera and a projector. For example, the camera is a CMOS (Complementary Metal-Oxide-Semiconductor) camera or a CCD (Charge-Coupled Device) camera, and the projector is a LED (Light Emitting Diode). In addition, the projector is preferably a near-infrared LED so that an image of the driver's face can be captured without causing discomfort to the driver even at low illuminance, such as at night, and the camera is also preferably capable of detecting near-infrared rays. For example, the projector may be two near-infrared LED located on either side of the camera. Further, the camera may be provided with a filter such as a visible light cut filter. The driver monitor camera 11 outputs images captured at predetermined intervals to the ECU 30 via the in-vehicle network 21.

The connection connector 12 is a connector that is connected to a connection connector of the towed vehicle 101 when the towed vehicle 101 is connected to the vehicle 100. To the towed vehicle 101, various types of signals are transmitted and power is supplied from the ECU 30 of the vehicle 100 via the connection connector 12. Thus, for example, the direction indicator of the towed vehicle 101 blinks or the braking light turns on in accordance with the operation of the driver of the vehicle 100. The connection connector 12 is connected to the ECU 30 via the in-vehicle network 21 and is used to transmit signals transmitted from the ECU 30 to the towed vehicle 101.

The HMI 13 is an interface for inputting and outputting information between the driver or the occupant and the driver monitor system 1. The HMI 13 includes an information providing device for providing various types of information to a driver or an occupant, and an input device for the driver or the occupant to perform an input operation.

Specifically, the HMI 13 includes, as an information providing device, a display 14 for displaying image information or character information. The display 14 is an example of a display device that displays an image. The display 14 may be any type of display device such as a liquid crystal display or an organic EL display. The display 14 is arranged so that at least the driver can confirm the screen. Accordingly, the display 14 is disposed, for example, on an instrument panel, a meter panel, or the like of the vehicle 100. The display 14 receives an image signal from the ECU 30 via the in-vehicle network 21, and displays an image in accordance with the image signal. Note that, the vehicle 100 may be provided with a display device using other methods, such as a head-up display or the like, as an information providing device, in addition to or instead of the display 14.

The HMI 13 includes a speaker 15 as an information providing device. The speaker 15 is an example of a device that outputs sound. The speaker 15 receives an audio signal from the ECU 30 via the in-vehicle network 21, and outputs sound in accordance with the audio signal. The HMI 13 may include, as the information providing device, a device other than the display 14 and the speaker 15 that provides various kinds of information to the drivers or the occupants (for example, a vibrating device).

In addition, the HMI 13 includes a touch panel 16 as an inputting device. The touch panel 16 is an example of a device in which input is performed by a driver or a passenger touching the device. The touch panel 16 is disposed on the front surface of the display 14, and outputs an operation signal to the ECU 30 via the in-vehicle network 21 when a touch operation is performed by a driver or an occupant. The HMI 13 may include, as the input device, a device other than the touch panel 16 for the driver or the occupant to perform the input operation (for example, a button, a switch, or the like).

The ECU 30 functions as an inattentiveness determination device that determines whether or not the drivers of the vehicles 100 are inattentive. The ECU 30 also controls information provided by the information providing device of the HMI 13. Therefore, the ECU 30 controls the images displayed on the display 14 and the sound outputted from the speaker 15. As shown in FIG. 2, the ECU 30 includes a communication interface 31, a storage unit 32, and a processor 33.

The communication interface 31 is a circuit for connecting the ECU 30 to the in-vehicle network 21.

The storage unit 32 stores data. The storage unit 32 includes, for example, at least one of a volatile semiconductor memory, a nonvolatile semiconductor memory, a hard disk drive (HDD), and a solid state drive (SSD). The storage unit 32 stores a computer program executed by the processor 33 of the ECU 30. The storage unit 32 also stores data used in a computer program executed by the processor 33, such as data transmitted from the driver monitor camera 11 or the like.

The processor 33 includes one or more CPU (Central Processing Unit) and its peripheral circuitry. The processor 33 may further include other arithmetic circuits such as a logical arithmetic unit or a numerical value arithmetic unit. The processor 33 executes a computer program stored in the storage unit 32.

FIG. 3 is a functional block diagram of the processor 33 of the ECU 30. As shown in FIG. 3, the processor 33 includes a line-of-sight direction detection unit 331, a towing determination unit 332, a condition setting unit 333, an inattentiveness determination unit 334, and a notification unit 335. These units included in the processor 33 are, for example, functional modules realized by a computer program running on the processor 33. Alternatively, the units included in the processor 33 may be implemented in the ECU 30 as separate integrated circuits, microprocessors, or firmware.

The line-of-sight direction detection unit 331 detects the line-of-sight direction of the driver based on the image captured by the driver monitor camera 11. The line-of-sight direction is represented by a horizontal or vertical angle between the front-rear direction of the vehicle 100 and the line-of-sight of the driver.

Specifically, the line-of-sight direction detection unit 331 detects the line-of-sight direction of the driver by a known image processing method, based on an image acquired from the driver monitor camera 11. As a specific image processing method, for example, directly calculating a line-of-sight direction based on an input image, or calculating an orientation of a face and an orientation of an eye with respect to a face based on an input image and calculating a line-of-sight direction based on the calculated orientation of the face and an orientation of an eye with respect to a face, may be considered.

The towing determination unit 332 determines whether or not the towed vehicle 101 is connected to the vehicle 100. In the present embodiment, the towing determination unit 332 determines whether or not a connection connector of the towed vehicle 101 is connected to the connection connector 12 of the vehicle 100. When it is determined that the connection connector of the towed vehicle 101 is connected to the connection connector 12 of the vehicle 100, the towing determination unit 332 determines that the towed vehicle 101 is connected to the vehicle 100. On the other hand, when it is determined that the connection connector of the towed vehicle is not connected to the connection connector 12 of the vehicle 100, the towing determination unit 332 determines that the towed vehicle 101 is not connected to the vehicle 100.

The towing determination unit 332 may perform determination based on devices other than the connection connector 12 as long as it can determine whether or not the towed vehicle 101 is connected to the vehicle 100. For example, when the vehicle 100 includes a rear camera that captures an image of the rear of the vehicle 100, the towing determination unit 332 may determine whether the towed vehicle 101 is connected to the vehicle 100 based on the image acquired from the rear camera. In this case, the image acquired from the rear camera is input to a discriminator that identifies the presence or absence of the towed vehicle 101. Alternatively, the towing determination unit 332 may determine whether or not the towed vehicle 101 is connected to the vehicle 100, based on input information input by the driver using the touch panel 16 of the HMI 13. In this case, when the driver inputs that the towed vehicle 101 is connected to the vehicle 100 via the touch panel 16, the towing determination unit 332 determines that the towed vehicle 101 is connected to the vehicle 100.

The condition setting unit 333 sets an inattentiveness determination condition for determining that the driver is in an inattentive state. In the present embodiment, the inattentiveness determination condition includes a condition related to a region in the line-of-sight direction of the driver and a duration time in which the line-of-sight direction is located in each region. Specifically, in the present embodiment, the condition setting unit 333 sets, for each region in the line-of-sight direction of the driver, as a threshold, a duration time for determining that the driver is in an inattentive state when the line-of-sight direction of the driver is located in the region.

Figure 4:
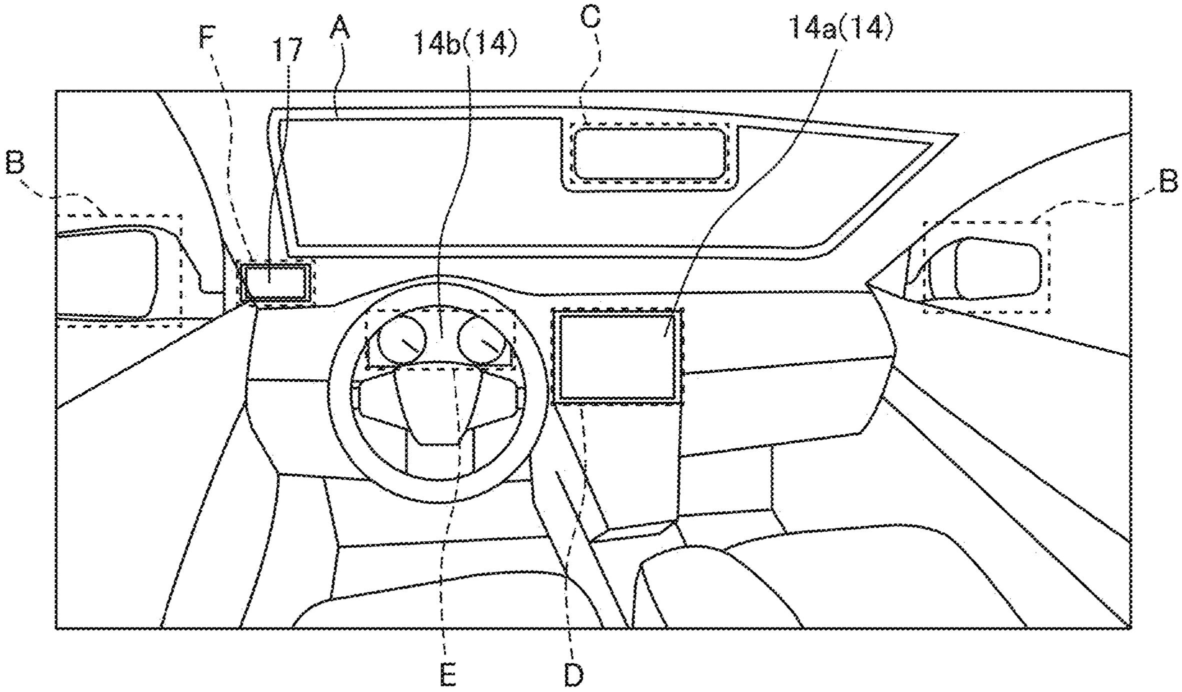
FIG. 4 is a diagram for explaining a region in which the driver is determined to be in an inattentive state during driving.

FIG. 4 is a diagram for explaining a region in which the driver is determined to be in an inattentive state during driving. During driving of the vehicle 100, the driver needs to visually recognize the front of the vehicle 100. Therefore, in the present embodiment, the inattentiveness determination condition is set so that the driver is not determined to be in the inattentive state, when the line-of-sight direction of the driver is in the front region A indicated by the solid line in the drawing, regardless of the duration time thereof.

On the other hand, during driving of the vehicle 100, the driver needs to temporarily visually recognize the region B in which the side mirror is located, the region C in which the rearview mirror is located, the region D in which the display 14 (central display 14*a*) in the center of the instrument panel is located, and the region E in which the display 14 (meter display 14*b*) of the meter panel is located. Therefore, when the line-of-sight direction of the driver is temporarily in these regions B to E, it is necessary to determine that the driver is not in the inattentive state. On the other hand, a driver should not visually recognize these regions B-E for a long period of time during driving. Therefore, in the present embodiment, the inattentiveness determination condition is set so that the driver is determined to be in the inattentive state when the line-of-sight direction of the driver is in the regions B to E for a predetermined first time period X or more, and the driver is determined not to be in the inattentive state when the line-of-sight direction of the driver is in the regions B to E for a period less than the first time period X.

In addition, in the present embodiment, a retrofit monitor 17 is provided inside the vehicle 100. The retrofit monitor 17 is attached by a user after the vehicle 100 is sold, and is not connected to the ECU 30, for example. The retrofit monitor 17 is, for example, a smartphone, and is used by a driver to use an application for navigation. The position of the retrofit monitor 17 is registered in advance by a driver or a user via the touch panel 16 of the HMI 13. In such a case, it is necessary for the driver to temporarily visually recognize the region F in which the retrofit monitor 17 is located, during driving of the vehicle 100. Therefore, in the present embodiment, similarly to the regions B to E, the inattentiveness determination condition is set so that when the line-of-sight of the driver is in the region F in which the retrofit monitor 17 is located for the first time period X or more, the driver is determined to be in the inattentive state, and when the line-of-sight of the driver is in the region F for less than the first time period X, the driver is determined not to be in the inattentive state.

In addition, regions other than the regions A to F are regions where the driver basically does not need to visually recognize even temporarily during driving. Therefore, in the present embodiment, the inattentiveness determination condition is set so that the driver is determined to be in an inattentive state when the line-of-sight direction of the driver is in a region other than the regions A to F for a predetermined second time period Y, which is shorter than the first time period X, or more, and the driver is determined not to be in an inattentive state when the line-of-sight direction of the driver is in a region other than the regions A to F for less than the second time period Y.

In addition, in the present embodiment, the inattentiveness determination condition changes based on the presence or absence of the connection of the towed vehicle 101 determined by the towing determination unit 332. Details related to the change of such an inattentiveness determination condition will be described later.

In the present embodiment, it is determined whether or not the driver is in the inattentive state at the same first time period X in the regions B to F. However, it may be determined whether or not the driver is in an inattentive state at different times for each of the regions B to F.

The inattentiveness determination unit 334 determines whether or not the driver is in an inattentive state, based on whether or not the line-of-sight direction of the driver satisfies the inattentiveness determination condition set by the condition setting unit 333. In particular, in the present embodiment, it is determined whether or not the driver is in an inattentive state, based on whether or not the line-of-sight direction of the driver detected by the line-of-sight direction detection unit 331 is continuously located in a specific region over a threshold value corresponding to the region. The inattentiveness determination unit 334 determines that the driver is in the inattentiveness state, for example, when the state in which the line-of-sight direction of the driver is a direction within the region B continues for the first time period X or more. On the other hand, the inattentiveness determination unit 334 determines that the driver is not in the inattentiveness state, for example, when the line-of-sight direction of the driver is a direction within the region A, or when the state in which the line-of-sight direction of the driver is a direction within the region B continues only for less than the first time period X.

The notification unit 335 notifies the driver when the inattentiveness determination unit 334 determines that the driver is in the inattentive state. For example, the notification unit 335 causes the display 14 to display that the driver is in an inattentive state. Alternatively, the notification unit 335 causes the speaker 15 to output, for example, a sound indicating that the driver is in an inattentive state.

Determination of Inattentiveness During Towing

Next, an inattentiveness determination in a case where the towed vehicle 101 is connected to the vehicle 100 will be described with reference to FIGS. 5 and 6. When the vehicle 100 is towing the towed vehicle 101, the driver checks a condition of the towed vehicle 101 at a certain frequency in order to check a state of the towed vehicle. The condition of the towed vehicle 101 is checked by the driver using a side mirror or a rearview mirror. In addition, when the rear image of the vehicle 100 is displayed on the central display 14*a*, the meter display 14*b*, or the retrofit monitor 17, the state of the towed vehicle 101 is checked by the driver by the central display 14*a*, the meter display 14*b*, or the retrofit monitor 17. Therefore, the regions B to F in which the side mirrors and the like are located can be referred to as regions (hereinafter, referred to as "towed vehicle viewing regions") in which the driver needs to visually recognize the towed vehicle image when the towed vehicle 101 is connected to the vehicle 100.

Therefore, in the present embodiment, when the towed vehicle 101 is connected to the vehicle 100, the condition setting unit 333 sets the inattentiveness determination condition so that the inattentiveness determination condition is relaxed as compared with when the towed vehicle is not connected to the vehicle 100. In particular, in the present embodiment, when the towed vehicle 101 is connected to the vehicle 100, the inattentiveness determination condition is relaxed so that the inattentiveness determination condition in the towed vehicle viewing region is relaxed as compared to when the towed vehicle is not connected to the vehicle 100.

Specifically, in the present embodiment, when the towed vehicle 101 is not connected to the vehicle 100, the condition setting unit 333 sets the towed vehicle viewing region as an inattentiveness determination region for determining that the driver is in an inattentive state when the line-of-sight direction of the driver is within the region for a predetermined time. On the other hand, when the towed vehicle 101 is connected to the vehicle 100, the condition setting unit 333 does not set the towed vehicle viewing region as the inattentiveness determination region. That is, when the towed vehicle 101 is connected to the vehicle 100, the condition setting unit 333 sets the inattentiveness determination condition such that the inattentiveness determination condition is not satisfied when the line-of-sight direction of the driver is within the towed vehicle viewing region. Therefore, when the towed vehicle 101 is not connected to the vehicle 100, the regions B to F in FIG. 4 are set as the inattentiveness determination region, whereas when the towed vehicle 101 is connected to the vehicle 100, the regions B to F in FIG. 4 are not set as the inattentiveness determination region.

According to the present embodiment, the inattentiveness determination condition is relaxed when the towed vehicle 101 is connected to the vehicle 100. As a result, when the driver is looking at the side mirror or the like for checking the towed vehicle 101, unnecessary determination that the driver is in the inattentive state is suppressed.

Figure 5:
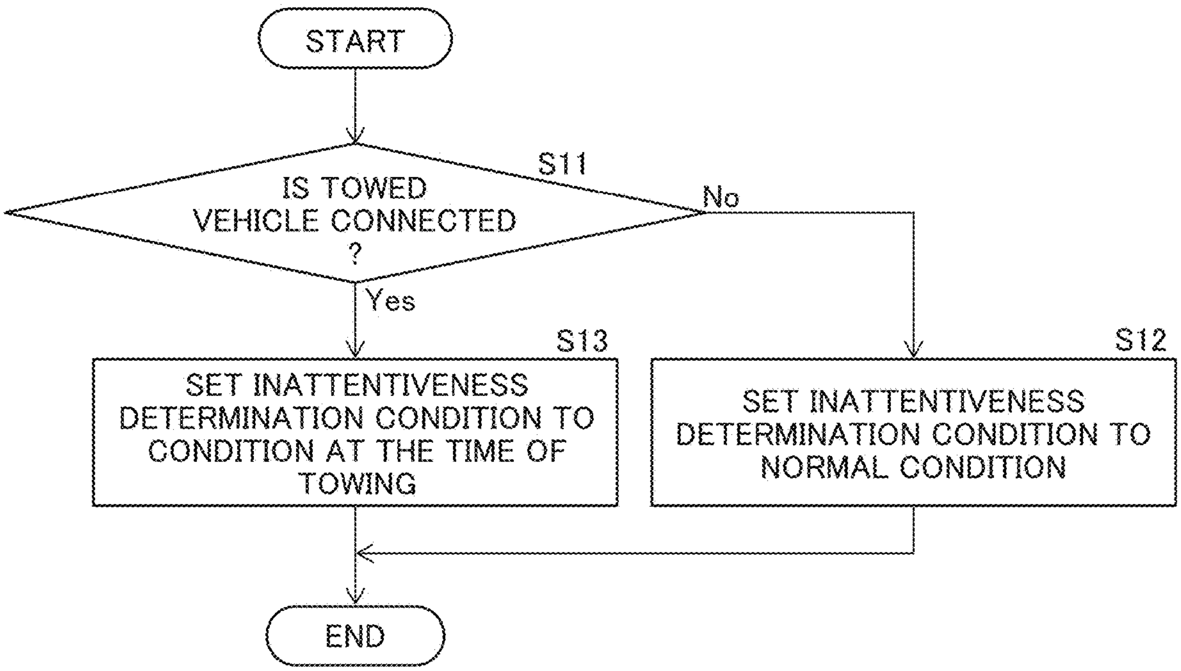
FIG. 5 is a flowchart showing a flow of a condition setting process for setting an inattentiveness determination condition.

FIG. 5 is a flowchart showing a flow of a condition setting process for setting an inattentiveness determination condition. The illustrated condition setting process is executed by the processor 33, for example, at regular time intervals.

As shown in FIG. 5, in the condition setting process, first, the towing determination unit 332 determines whether or not the towed vehicle 101 is connected to the vehicle 100 (step S11). As described above, the towing determination unit 332 determines whether or not the connection connector of the towed vehicle 101 is connected to the connection connector 12 of the vehicle 100.

When it is determined in step S11 that the towed vehicle 101 is not connected to the vehicle 100, the condition setting unit 333 sets the inattentiveness determination condition to the normal condition (step S12). Therefore, the condition setting unit 333 sets the towed vehicle viewing region (for example, the regions B to F) as the inattentiveness determination region.

On the other hand, when it is determined in step S11 that the towed vehicle 101 is connected to the vehicle 100, the condition setting unit 333 sets the inattentiveness determination condition to the condition at the time of towing (step S13). Therefore, the condition setting unit 333 does not set the towed vehicle viewing region (for example, the regions B to F) as the inattentiveness determination region.

Figure 6:
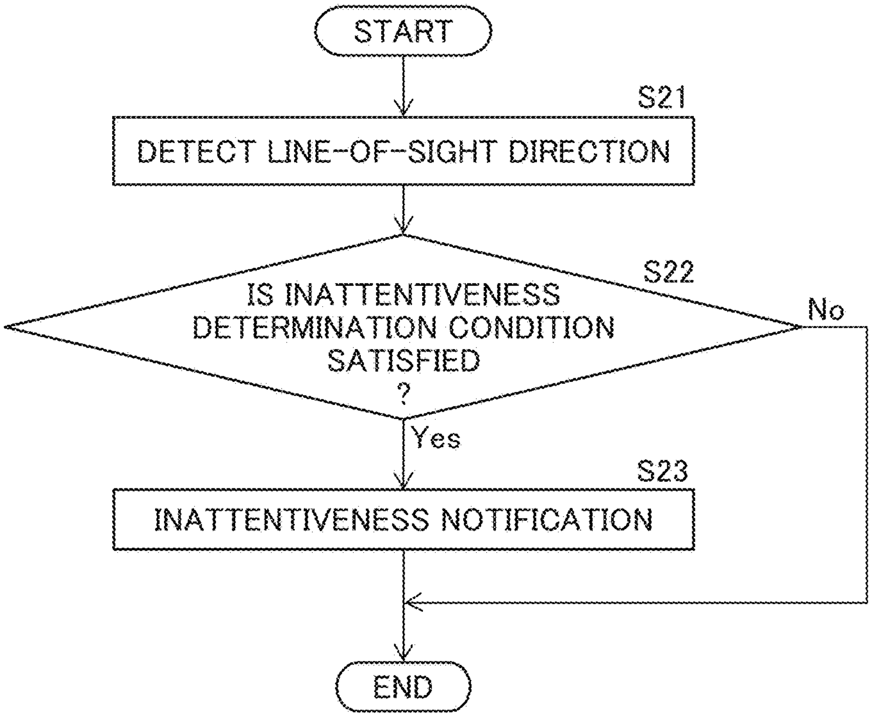
FIG. 6 is a flowchart showing a flow of an inattentiveness determination process for performing inattentiveness determination.

FIG. 6 is a flowchart showing a flow of an inattentiveness determination process for performing inattentiveness determination. The illustrated inattentiveness determination process is executed by the processor 33, for example, at regular time intervals.

As shown in FIG. 6, in the inattentiveness determination process, the line-of-sight direction detection unit 331 first detects the line-of-sight direction of the driver (step S21). As described above, the line-of-sight direction detection unit 331 detects the line-of-sight direction of the driver, based on the image captured by the driver monitor camera 11.

Next, the inattentiveness determination unit 334 determines whether or not the line-of-sight direction of the drivers detected by the line-of-sight direction detection unit 331 satisfies the inattentiveness determination condition (step S22). The inattentiveness determination condition used here is a condition currently set in step S12 or S13 of the condition setting process shown in FIG. 5.

When it is determined in step S22 that the line-of-sight direction of the driver does not satisfy the inattentiveness determination condition, the inattentiveness determination process is terminated without notifying the driver. On the other hand, if it is determined in step S22 that the line-of-sight direction of the driver satisfies the inattentiveness determination condition, the notification unit 335 notifies that the driver is in the inattentive state via the display 14 or the speaker 15.

Modification

Next, one modification will be described with reference to FIG. 7. In the above-described embodiment, when the towed vehicle 101 is connected to the vehicle 100, the towed vehicle viewing region is not set as the inattentiveness determination region. On the other hand, in the present modification, even when the towed vehicle 101 is connected to the vehicle 100, the towed vehicle viewing region remains set as the inattentiveness determination region. However, in the present modification, when the towed vehicle 101 is connected to the vehicle 100, the inattentiveness determination condition in the towed vehicle viewing region is relaxed as compared with the case where the towed vehicle 101 is not connected to the vehicle 100. On the other hand, for a region other than the towed vehicle viewing region, the inattentiveness determination condition is not changed according to whether or not the towed vehicle 101 is connected to the vehicle 100.

Specifically, in the present modification, when the towed vehicle 101 is connected to the vehicle 100, the condition setting unit 333 increases the threshold value regarding the duration time in the towed vehicle viewing region as compared to when the towed vehicle 101 is not connected to the vehicle 100. That is, the condition setting unit 333 sets the inattentiveness determination condition such that, in the case where the line-of-sight direction of the driver is within the towed vehicle viewing region, when the towed vehicle 101 is connected to the vehicle 100, the inattentiveness determination condition is satisfied for a longer duration time than when the towed vehicle 101 is not connected to the vehicle 100.

Therefore, in the present modification, when the towed vehicle 101 is not connected to the vehicle 100, it is determined that the driver is in the inattentive state when the state in which the line-of-sight direction of the driver is in the regions B to F in FIG. 4 continues for the first time period X or more. On the other hand, when the towed vehicle 101 is connected to the vehicle 100, it is determined that the driver is in the inattentive state when the state in which the line-of-sight direction of the driver is in the regions B to F in FIG. 4 continues for the third time period Z, which is longer than the first time period X (Z>X), or more.

Further, in the present modification, when the towed vehicle 101 is connected to the vehicle 100, in the case where the line-of-sight direction of the driver is within the towed vehicle viewing region, notification to the driver is performed in a manner (second manner) different from a manner (first manner) when the towed vehicle 101 is not connected to the vehicle 100. On the other hand, in the case where the line-of-sight direction of the driver is outside the towed vehicle viewing region, even if the towed vehicle 101 is connected to the vehicle 100, the driver is notified in the same manner as when the towed vehicle 101 is not connected to the vehicle 100.

Specifically, in the present embodiment, in a case where the line-of-sight direction of the driver is within the towed vehicle viewing region, when the towed vehicle 101 is connected to the vehicle 100, the notification unit 335 causes the speaker 15 to output sound so that the notification sound from the speaker 15 becomes smaller than when the towed vehicle 101 is not connected to the vehicle 100.

In addition, in a case where the line-of-sight direction of the driver is within the towed vehicle viewing region, when the towed vehicle 101 is connected to the vehicle 100, the notification unit 335 may cause the speaker 15 to output sound so as to generate a notification sound different from that when the towed vehicle 101 is not connected to the vehicle 100. In addition, in the present embodiment, when the towed vehicle 101 is connected to the vehicle 100, the notification unit 335 may cause the display 14 to display an image in a manner different from that when the towed vehicle 101 is not connected to the vehicle 100. In this case, when the towed vehicle 101 is connected to the vehicle 100, the output of the sound and the screen display are performed in such a manner that the driving of the driver is not disturbed or the driver does not easily distract the attention, as compared with when the towed vehicle 101 is not connected to the vehicle 100.

Figure 7:
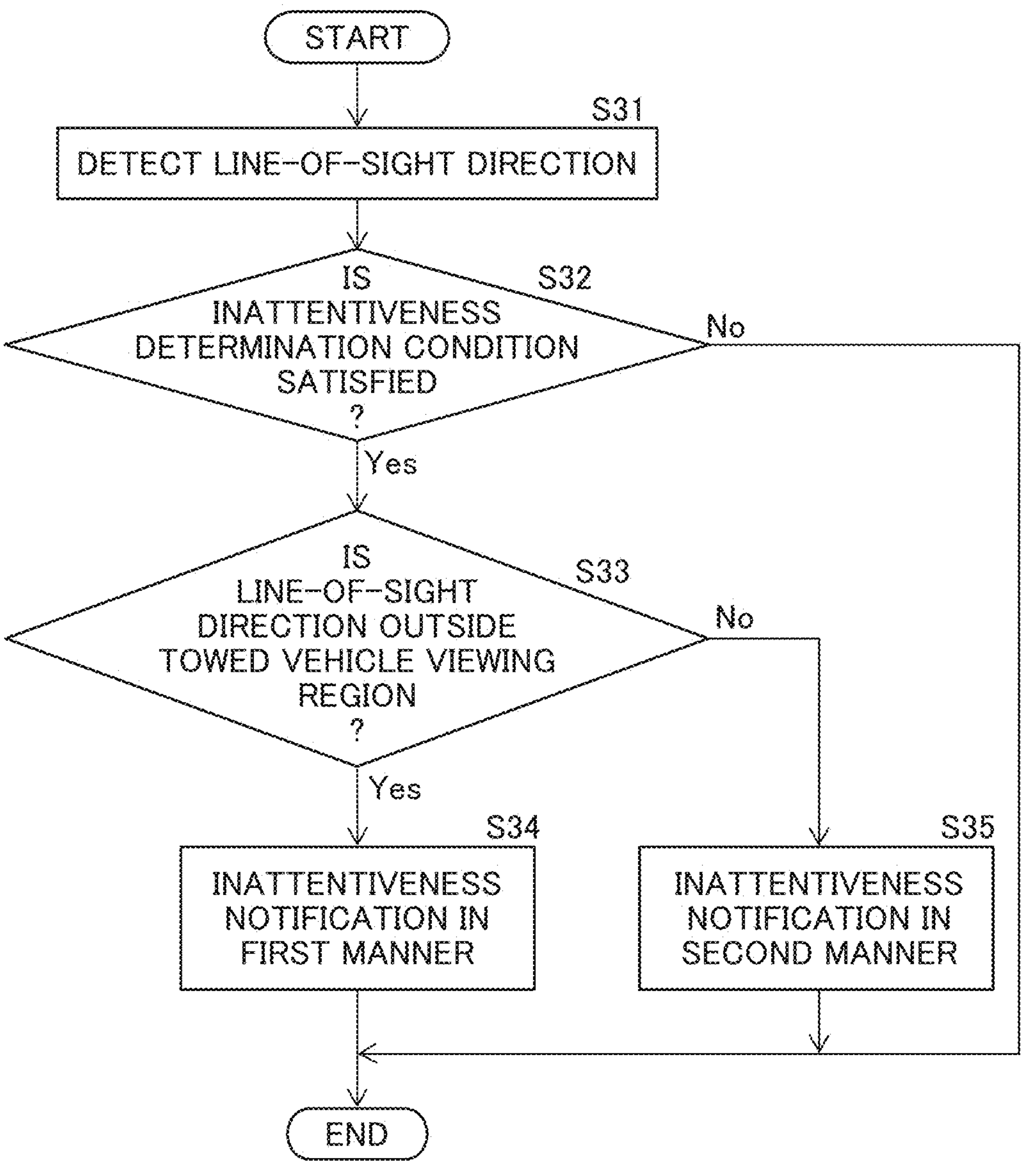
FIG. 7 is a flowchart, similar to that of FIG. 6, showing a flow of an inattentiveness determination process for performing inattentiveness determination.

FIG. 7 is a flowchart, similar to that of FIG. 6, showing a flow of an inattentiveness determination process for performing inattentiveness determination. Step S31 and S32 in FIG. 7 are the same as step S21 and S22 in FIG. 6, and therefore the explanation thereof will be omitted.

When it is determined in step S32 that the line-of-sight direction of the driver satisfies the inattentiveness determination condition, the notification unit 335 determines whether or not the line-of-sight direction of the driver is outside the towed vehicle viewing region (step S33). The notification unit 335 performs determination based on the line-of-sight direction of the drivers detected in step S31.

When it is determined in step S33 that the line-of-sight direction of the driver is outside the towed vehicle viewing region, the notification unit 335 notifies the driver of the inattentive state in the first manner (step S34). Therefore, for example, notification is performed with a relatively large notification sound. On the other hand, when it is determined in step S33 that the line-of-sight direction of the driver is within the towed vehicle viewing region, the notification unit 335 notifies the driver of the inattentive state in the second manner (step S35). Therefore, for example, notification is performed with a relatively small notification sound.

In the present modification, when the towed vehicle 101 is connected to the vehicle 100, the inattentiveness determination condition in the towed vehicle viewing region is relaxed while the inattentiveness determination region remains unchanged. Accordingly, when the towed vehicle 101 is connected to the vehicle 100 and the driver is looking at the towed vehicle viewing region more than necessary, it is suppressed that the driver is not determined to be in an inattentive state. Further, in the present modification, the notification manner to the driver is changed according to whether or not the line-of-sight direction of the driver is within the towed vehicle viewing region, and in particular, when the line-of-sight direction is within the towed vehicle viewing region, the notification is performed in such a manner that the influence on the driving of the driver is small. Therefore, when the driver is visually recognizing the towed vehicle 101, the driver is prevented from being notified of inattentiveness in such a manner that the influence on the driving is large.

In the above-described embodiment and modification, the inattentiveness determination condition for the region in which the display 14 and the retrofit monitor 17 are located is relaxed regardless of whether or not an image of the rear side of the vehicle 100 (an image around the towed vehicle 101) is displayed on the display 14 and the retrofit monitor 17. However, the inattentiveness determination condition for the region in which the display 14 and the retrofit monitor 17 are located may be relaxed only when the rear image of the vehicle 100 is displayed on the display 14 and the retrofit monitor 17.

While preferred embodiments according to the present disclosure have been described above, the present disclosure is not limited to these embodiments, and various modifications and changes can be made within the scope of the claims.

The invention claimed is:

1. An inattentiveness determination device which determines whether or not a driver of a vehicle is inattentive, comprising a processor, the processor is configured to:

detect a line-of-sight direction of the driver;

determine whether or not a towed vehicle is connected to the vehicle;

determine whether or not the driver is an inattentive state, based on whether or not a line-of-sight direction of the driver satisfies an inattentiveness determination condition; and set the inattentiveness determination condition so that when the towed vehicle is connected to the vehicle, the inattentiveness determination condition is relaxed as compared with when the towed vehicle is not connected to the vehicle.

2. The inattentiveness determination device according to claim 1, wherein the inattentiveness determination condition includes a condition relating to a region of a line-of-sight direction of the driver, and the processor is configured to set the inattentiveness determination condition such that, when the towed vehicle is connected to the vehicle, in the case where the line-of-sight direction of the driver is within a towed vehicle viewing region for visually recognizing an image of the towed vehicle, the inattentiveness determination condition is not satisfied.

3. The inattentiveness determination device according to claim 1, wherein the inattentiveness determination condition includes a condition relating to a region in the line-of-sight direction of the driver and a duration time of viewing each region, and the processor is configured to set the inattentiveness determination condition so that, in the case where the line-of-sight direction of the driver is within the towed vehicle viewing region for visually recognizing an image of the towed vehicle, when the towed vehicle is connected to the vehicle, the inattentiveness determination condition is satisfied with a longer duration time than when the towed vehicle is not connected.

4. The inattentiveness determination device according to claim 3, wherein the processor is configured to notify the driver when it is determined that the driver is in an inattentive state, wherein when the towed vehicle is connected to the vehicle, in the case where the line-of-sight direction of the driver is within a towed vehicle viewing region for visually recognizing an image of the towed vehicle, the processor is configured to notify the driver in a manner different from that when the towed vehicle is not connected to the vehicle.

5. An inattentiveness determination method for determining whether or not a driver of a vehicle is inattentive, including:

detecting a line-of-sight direction of the driver;

determining whether or not a towed vehicle is connected to the vehicle;

determining whether or not the driver is in an inattentive state, based on whether or not a line-of-sight direction of the driver satisfies an inattentiveness determination condition; and setting the inattentiveness determination condition so that when the towed vehicle is connected to the vehicle, the inattentiveness determination condition is relaxed as compared with when the towed vehicle is not connected to the vehicle.

* * * * *